United States Patent
Chen et al.

(10) Patent No.: US 8,527,792 B2
(45) Date of Patent: Sep. 3, 2013

(54) POWER SAVING METHOD AND APPARATUS THEREOF

(75) Inventors: Hsuan-Ting Chen, Taichung (TW);
Yi-Kai Peng, Hualien County (TW);
Kuei-Huan Chen, New Taipei (TW)

(73) Assignee: Synology Incorporated, Taipei (TW)

( * ) Notice: Subject to any disclaimer, the term of this patent is extended or adjusted under 35 U.S.C. 154(b) by 213 days.

(21) Appl. No.: 13/106,875

(22) Filed: May 13, 2011

(65) Prior Publication Data
US 2012/0290861 A1 Nov. 15, 2012

(51) Int. Cl.
*G06F 1/32* (2006.01)
*G06F 9/24* (2006.01)

(52) U.S. Cl.
USPC .................... 713/320; 713/1; 713/300

(58) Field of Classification Search
USPC ................................ 713/300, 320, 1
See application file for complete search history.

(56) References Cited

U.S. PATENT DOCUMENTS

| | | | | |
|---|---|---|---|---|
| 5,659,762 A * | 8/1997 | Sawada et al. | | 713/323 |
| 5,799,199 A | 8/1998 | Ito | | |
| 5,819,100 A * | 10/1998 | Pearce | | 713/323 |
| 6,327,653 B1 * | 12/2001 | Lee | | 713/323 |
| 6,493,828 B1 * | 12/2002 | Yamaguchi et al. | | 713/324 |
| 6,885,974 B2 * | 4/2005 | Holle | | 713/324 |
| 7,017,037 B2 * | 3/2006 | Fortin et al. | | 713/2 |
| 7,949,814 B2 * | 5/2011 | Chan | | 710/304 |
| 8,392,539 B1 * | 3/2013 | Chen et al. | | 709/220 |
| 2004/0073783 A1 * | 4/2004 | Ritchie | | 713/1 |
| 2005/0120256 A1 | 6/2005 | Lu | | |
| 2007/0101077 A1 * | 5/2007 | Evanchik et al. | | 711/162 |
| 2009/0019301 A1 | 1/2009 | Minami | | |

OTHER PUBLICATIONS

Adel et al, Is it dangerous to add/remove a hard-drive to a Windows machine which is in stand by?, Dec. 28, 2010, http://superuser.com/questions/226415/is-it-dangerous-to-add-remove-a-hard-drive-to-a-windows-machine-which-is-in-stan.*

MacInnis John, Implementing Firmware for Embedded Intel Architecture Systems: OS-Directed Power Management (OSPM) through the Advanced Configuration and Power Interface (ACPI), 2009, http://www.multicoreinfo.com/research/intel/ospm-acpi.pdf.*

* cited by examiner

*Primary Examiner* — Mark Connolly
(74) *Attorney, Agent, or Firm* — Winston Hsu; Scott Margo

(57) ABSTRACT

At startup of an apparatus including a memory and an operating device, an operating system is loaded to the memory as an operating system. While an idle time of the operating device exceeds a predetermined time, the loaded operating system cuts power to the operating device so that the operating device can be completely shut down. As a result, power consumption of the operating device is significantly reduced.

19 Claims, 3 Drawing Sheets

POWER SAVING METHOD AND APPARATUS THEREOF

BACKGROUND OF THE INVENTION

1. Field of the Invention

The present invention relates to a power saving method and an apparatus thereof, and more particularly, to a power saving method of completely cutting power to an operating device and an apparatus of running the power saving method thereof

2. Description of the Prior Art

When running a conventional power saving design on a hard drive, both a spindle and a platter of the hard drive is ceased running, and the read/write head of the hard drive is also re-positioned, so as to enter a conventional sleep mode, i.e., disk hibernation. With the aid of the above operations, power consumption of the hard drive can be reduced by at least half.

However, during the disk hibernation, some elements for controlling mechanism of the hard drive, such as a PCB board or a chip disposed inside the hard drive, are still consuming power; therefore, power consumption from controlling elements inside the hard drive is remained significant. For example, for a hard drive having a capacity of two tera-bytes, the power consumption under normal operations is about 11 watts, and the power consumption under the disk hibernation is 1.2 watts, which indicates significant power consumption while the hard drive is idle for a long period of time.

SUMMARY OF THE INVENTION

The claimed invention discloses a power saving method for an operating device of an apparatus. The power saving method comprises loading an operating system to a memory of the apparatus; the loaded operating system calculating an idle time of the operating device; and the loaded operating system cutting power to the operating device when the idle time exceeds a predetermined idle time.

The apparatus comprises an operating device and a memory. The memory is coupled to and external to the operating device. The memory comprises the operating system loaded from the operating device. The loaded operating system is utilized for calculating an idle time of the operating device and cutting power to the operating device when idle time of the operating device exceeds a predetermined idle time.

These and other objectives of the present invention will no doubt become obvious to those of ordinary skill in the art after reading the following detailed description of the preferred embodiment that is illustrated in the various figures and drawings.

DETAILED DESCRIPTION

For further reducing the power consumption of the hard drive, the present invention discloses a power saving method for the hard drive and an apparatus, which includes at least an operating device of various types and a memory, for running the power saving method, where the operating device may be a hard drive. The primary technique used in the present invention is to completely cut power to the hard drive, without influencing normal operations of the apparatus.

Figure 1:
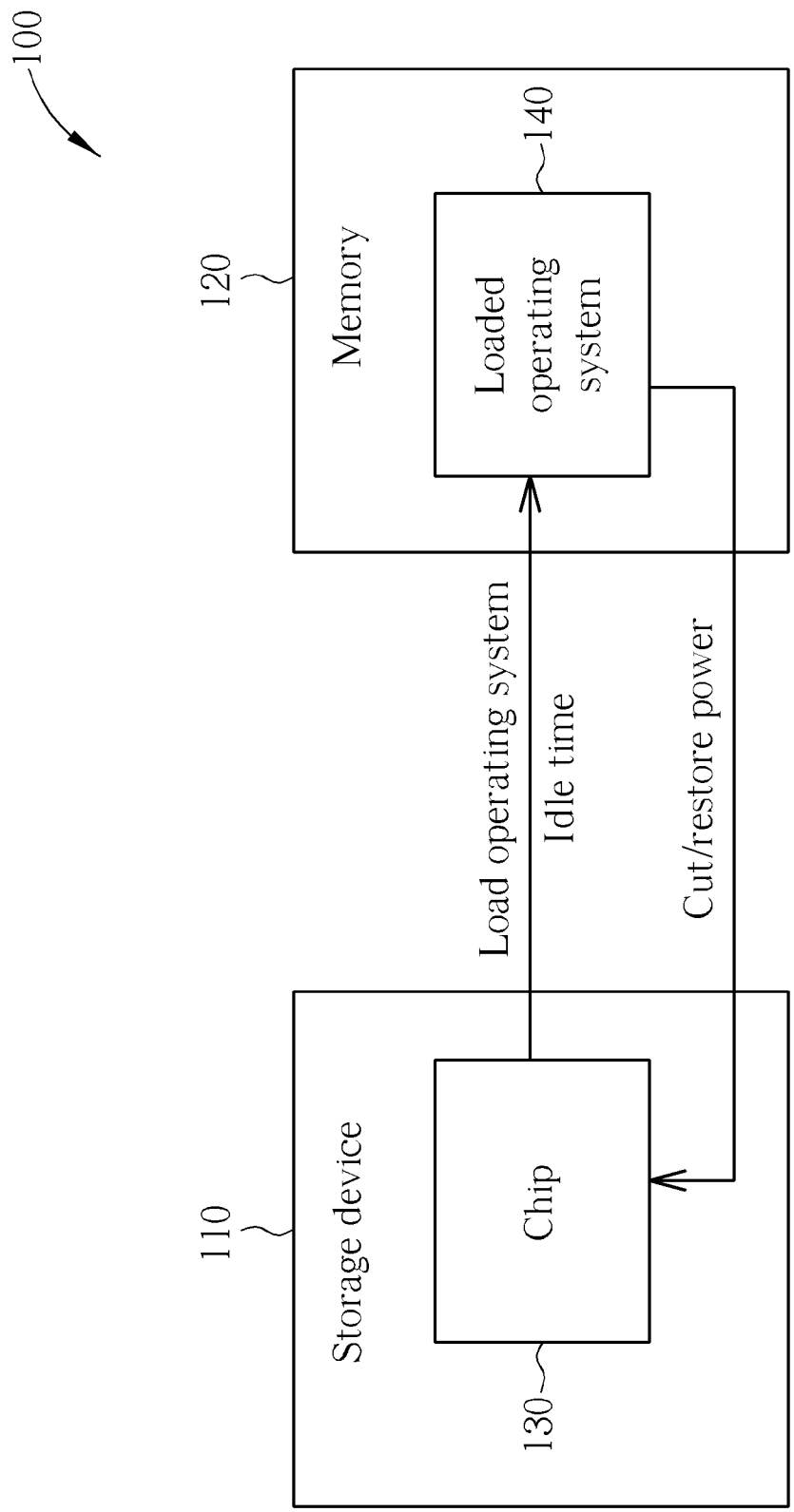
FIGS. 1 and 2 schematically illustrate apparatus disclosed according to two embodiments of the present invention.

Please refer to FIG. 1, which schematically illustrates an apparatus 100 disclosed according to an embodiment of the present invention, where the apparatus 100 includes an operating device 110 and a memory 120, where the operating device 110 is coupled to and external to the memory 120.

The operating device 110 may be a hard drive, a flash drive, a solid-state drive, an optical disc drive, a compact disc burner, and/or an extension hard drive in embodiments of the present invention. The operating device 110 also includes a chip for storing an operating system, for manipulating its own operations. Note that the operating system may also be stored at somewhere inside the operating device 110 and other than the chip 130 in another embodiment of the present invention.

The memory 120 is utilized for buffering data from the operating device 110.

A whole procedure of the apparatus 100 for running the power saving method of the present invention is introduced as follows.

First, at a startup of the apparatus, the operating system 130 is loaded from the operating device 110 to the memory 130, to generate a loaded operating system 140 as a running system.

During normal operations of the hard drive, such as reading and writing operations, the operating device 110 is in a busy status and would be required to transit to an idle status while there are no further operations on the operating device 110. When the operating device 110 stays idle, the loaded operating system 140 keeps calculating an idle time of the operating device 110 and keeps comparing the idle time with a predetermined idle time, for example, five minutes as a default value. Note that the predetermined idle time may also be set manually or dynamically adjusted by the apparatus 100 in other embodiments of the present invention.

When the calculated idle time exceeds the predetermined idle time, the loaded operating system 140 cuts the power to the chip 130 on the operating device 110. Therefore, the entire storage device 110, inclusive of the chip 130, is completely shut down for saving power, i.e., the operating device 110 leaves the idle status and enters a deep-sleep status. However, at the same time, the loaded operating system 140 also monitors the apparatus 100 for determining whether an attempt to access the operating device occurs. With the aid of the loaded operating system 140, the apparatus 100 is not aware of the fact that the operating device 110 has been shut down so that normal operations of the apparatus 100 will not be influenced.

Then, while occurrence of the attempt to access the operating device 110 is determined on the apparatus 100, the loaded operating system 140 restores the power to and operations of the operating device 110 so that the operating device 110 leaves the deep-sleep status and enters the busy status. Therefore, the operating device 110 can be restored to its normal operations again, until a next time when the idle time of the operating device 110 exceeds the predetermined idle time.

While the power to the operating device 110 is completely cut, besides some mechanical elements of the operating device 110, the chip 130 is also shut down, so that no power consumption is introduced at this time, and the primary purpose of the present invention is thus fulfilled.

Note that while the operating device 120 stays at the deep-sleep status, said storage device 110 may be removed or replaced by a new storage device staying at the deep-sleep mode as initialization. After the new storage device leaves the deep-sleep status and enters the busy status, the apparatus 100 will update necessary hardware status and/or perform required settings for the new storage device, without influencing normal operations of the apparatus 100 as well.

In some embodiments of the present invention, there are some hardware interfaces utilized for communicating between the operating device 110 and the memory 120, so as to transmit the idle time, load the operating system, cut or restore power to the operating device 110. The hardware interfaces may include a universal serial bus (USB) interface, a serial advanced technology attachment (SATA) interface, a general purpose input/output (GPIO) interface, an inter-integrated circuit ($I^2C$ or I-squared-C) interface, a network, or an optical-fiber network.

In some embodiments of the present invention, the operating system is not stored on the operating device in the beginning, instead, the operating system is stored on an external supporting device coupled to the apparatus 100 and loaded from the external supporting device to the memory 120. Please refer to FIG. 2, which illustrates another embodiment of the present invention by loading the operating system from an external supporting device 150 to the memory 120 of the apparatus 100. The only difference between embodiments shown in FIGS. 1 and 2 lies on where the operating system is loaded from an external supporting device 150 which is coupled to the apparatus 100.

In certain embodiments, the storage device 110 and the memory 120 are remotely coupled to each other, with the aid of a substantial connection or a wireless connection, such as a substantial network or a wireless network.

Figure 2:
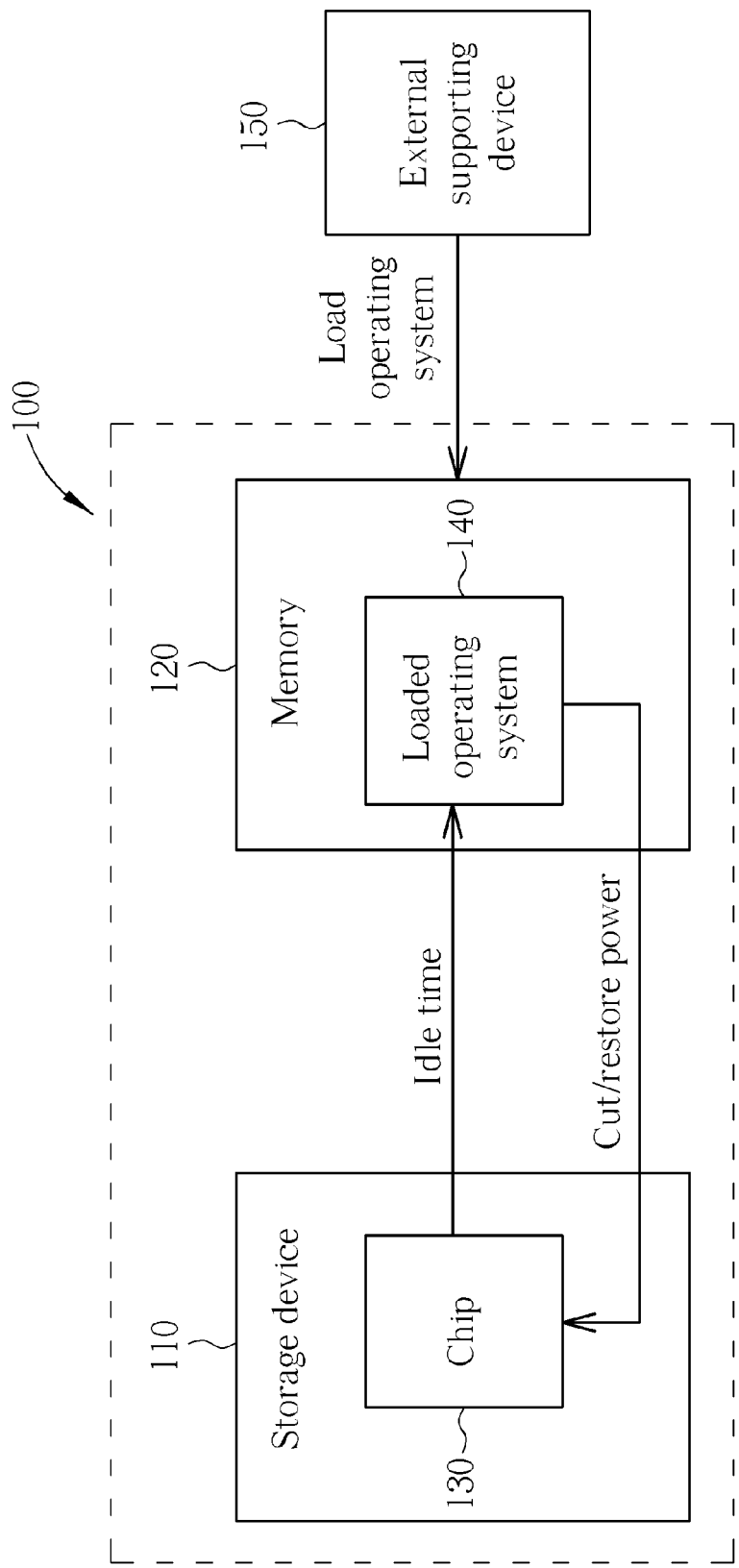
Figure 3:
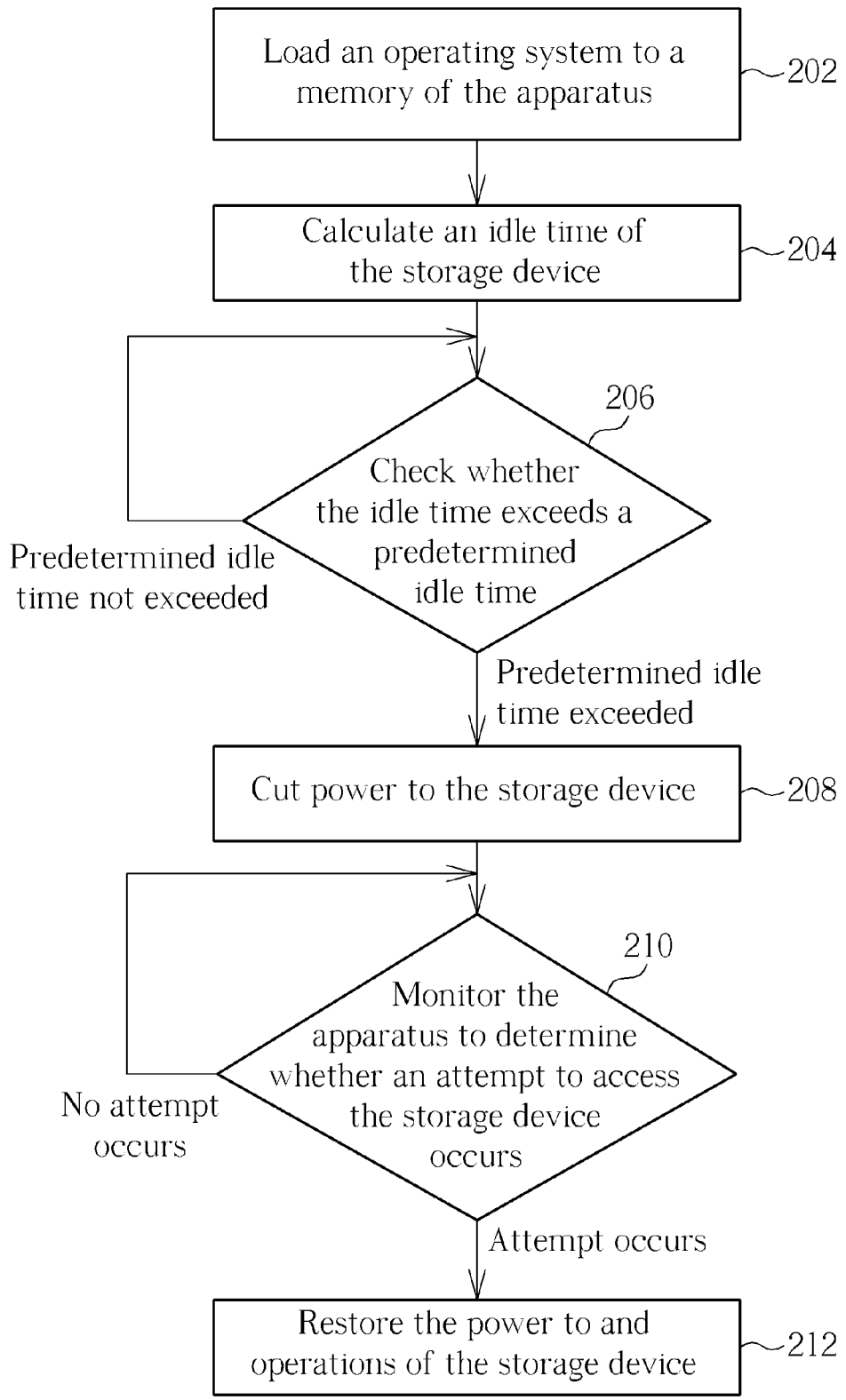
FIG. 3 schematically illustrates a diagram of the power saving method disclosed according to the description related to FIGS. 1 and 2.

Please refer to FIG. 3, which schematically illustrates a diagram of the power saving method disclosed according to the description related to FIGS. 1 and 2. As shown in FIG. 3, the power saving method includes steps as follows:

Step 202: Load an operating system to a memory of the apparatus, and go to Step 204.

Step 204: Calculate an idle time of the operating device, and go to Step 206.

Step 206: Check whether the idle time exceeds a predetermined idle time. When the idle time exceeds a predetermined idle time, go to Step 208; else, go to Step 206.

Step 208: Cut power to the operating device, and go to Step 210.

Step 210: Monitor the apparatus to determine whether an attempt to access the operating device occurs. When the attempt occurs, go to Step 212; else, go to Step 210.

Step 212: Restore the power to and operations of the operating device, and go to Step 204.

Note that embodiments generated by reasonable combinations or permutations of the steps shown in FIG. 3, or by adding conditions mentioned in the current specification into the steps shown in FIG. 3, are supposed to be regarded as embodiments of the present invention.

The present invention discloses a power saving method and an apparatus for running the power saving method. By completely shutting down the operating device when an idle time of the operating device exceeds a predetermined idle time, power consumption of the operating device staying idle can be further saved.

Those skilled in the art will readily observe that numerous modifications and alterations of the device and method may be made while retaining the teachings of the invention.

What is claimed is:

1. A power saving method for an operating device of an apparatus, comprising:
   loading an operating system to a memory of the apparatus, the operating system being configured to manipulate operations of the operating device, and the memory being disposed external to the operating device;
   the loaded operating system in the memory calculating an idle time of the operating device;
   the loaded operating system in the memory cutting power to the operating device for completely shutting down the operating device when the idle time exceeds a predetermined idle time;
   the loaded operating system in the memory monitoring the apparatus to determine whether an attempt to access the operating device occurs; and
   the loaded operating system in the memory restoring the power to and operations of the operating device when the loaded operating system in the memory determines that the attempt to access the operating device occurs.

2. The power saving method of claim 1 wherein the operating device is a hard drive, a flash drive, a solid-state drive, an optical disc drive, a compact disc burner, an extension hard drive, an extension device, or a hub.

3. The power saving method of claim 1 further comprising:
   when the operating device is removed or replaced by a replacement storage device while power of the operating device is cut, after the power to the replacement storage device is recovered, updating a hardware status and performing settings for the replacement storage device.

4. The power saving method of claim 1 further comprising:
   utilizing a hardware interface for communicating between the operating device and the memory.

5. The power saving method of claim 4 wherein the hardware interface is a universal serial bus (USB) interface, a serial advanced technology attachment (SATA) interface, a general purpose input/output (GPIO) interface, an inter-integrated circuit ($I^2C$ or I-squared-C) interface, a network, or an optical-fiber network.

6. The power saving method of claim 1 wherein loading the operating system to the memory comprises:
   loading the operating system from the operating device.

7. The power saving method of claim 1 wherein loading the operating system to the memory comprises:
   loading the operating system from an external supporting device connected to the apparatus.

8. An apparatus comprising:
   an operating device; and
   a memory coupled to and external to the operating device, the memory comprising an externally-loaded operating system, the externally-loaded operating system being configured to manipulate operations of the operating device, configured to calculate an idle time of the operating device, configured to cut power to the operating device for completely shutting down the operating device when idle time of the operating device exceeds a predetermined idle time, configured to monitor the apparatus to determine whether an attempt to access the operating device occurs, and configured to restore the power and operations of the operating device when the externally-loaded operating system in the memory determines that the attempt to access the operating device occurs.

9. The apparatus of claim 8 wherein the operating device is a hard drive, a flash drive, a solid-state drive, an optical disc drive, a compact disc burner, an extension hard drive, an extension device, or a hub.

10. The apparatus of claim 8 wherein when the operating device is removed or replaced by a replacement storage device during the operating device is cut power, after the power to the replacement storage device is recovered, the apparatus is configured to update a hardware status and/or perform settings for the replacement storage device.

11. The apparatus of claim 8 further comprising:

a hardware interface for communicating between the operating device and the memory.

12. The apparatus of claim 11 wherein the hardware interface is a universal serial bus (USB) interface, a serial advanced technology attachment (SATA) interface, a general purpose input/output (GPIO) interface, an inter-integrated circuit ($I^2C$ or I-squared-C) interface, a network, or an optical-fiber network.

13. The apparatus of claim 8 wherein the externally-loaded operating system is loaded from the operating device.

14. The apparatus of claim 8 wherein the externally-loaded operating system is loaded from an external supporting device coupled to the apparatus.

15. A power saving method for an operating device of an apparatus, comprising:

loading an operating system from the operating device to a memory of the apparatus, the operating system being configured to manipulate operations of the operating device, and the memory being disposed external to the operating device;

the loaded operating system in the memory calculating an idle time of the operating device; and the loaded operating system in the memory cutting power to the operating device for completely shutting down the operating device when the idle time exceeds a predetermined idle time.

16. The power saving method of claim 15 wherein the operating device is a hard drive, a flash drive, a solid-state drive, an optical disc drive, a compact disc burner, an extension hard drive, an extension device, or a hub.

17. The power saving method of claim 15 further comprising:

when the operating device is removed or replaced by a replacement storage device while power of the operating device is cut, after the power to the replacement storage device is recovered, updating a hardware status and performing settings for the replacement storage device.

18. The power saving method of claim 15 further comprising:

utilizing a hardware interface for communicating between the operating device and the memory.

19. The power saving method of claim 18 wherein the hardware interface is a universal serial bus (USB) interface, a serial advanced technology attachment (SATA) interface, a general purpose input/output (GPIO) interface, an inter-integrated circuit ($I^2C$ or I-squared-C) interface, a network, or an optical-fiber network.

\* \* \* \* \*